Patented Aug. 12, 1941

2,252,393

UNITED STATES PATENT OFFICE 2,252,393

COMPLEX ESTERS AND PROCESSES OF PRODUCING SAME

Theodore F. Bradley and William B. Johnston, Stamford, Conn., assignors to American Cyanamid Company, New York, N. Y., a corporation of Maine No Drawing. Application September 12, 1939, Serial No. 294,485

10 Claims. (Cl. 260—22)

This invention relates to complex esters and to methods of producing the same. It is particularly concerned with esters which are complex reaction products of a terpene with an ester of fumaric acid, and methods of producing the same.

As described in our copending application Serial No. 215,584, filed June 24, 1938, entitled "Esters and methods of producing the same," fumaric acid is not reactive with non-conjugated terpenes at the reaction temperatures usually employed in the production of alkyd resins or terpene-maleic anhydride complexes.

An object of the present invention is to provide a means whereby the inactivity of fumaric acid toward the non-conjugated terpene hydrocarbons may be overcome and thus a new and useful series of derivatives made available for industrial purposes.

It is another object of this invention to provide a process by which the materials employed may be readily and efficiently reacted to produce directly an alkyd-polyester mixture relatively free from undesirable polybasic acid compounds.

These and other objects are attained by causing esters of fumaric acid to combine chemically with a terpene of the $C_{10}H_{16}$ series to produce complex esters which are formed during the reaction that apparently involves the unsaturation of both the terpene and the fumaric acid. We have found that if esters of fumaric acid be reacted with one or more terpenes of the $C_{10}H_{16}$ series, there results chemical interaction and esters of relatively low acid number are formed in high yields without objectionable side reactions or decompositions.

The principles and practice of our invention will be more clearly understood by reference to the examples given by way of illustration and not in limitation. In each of the following examples the stipulated amounts of terpene and ester of fumaric acid are placed in a reaction vessel. A reflux condenser and preferably also a water trap may be attached to the reaction vessel. The mixture is agitated by any suitable means during the heating operation and the temperature of the reaction mixture is held continuously at the reflux point so that the excess of unreacted terpene and the water of esterification are distilled together, condensed and separated, and the separated terpene is returned to the reaction mixture.

In general, the reaction mixture is heated to about 140°–160° C. and may then gradually be raised to from about 180° C. to about 210° C.

The exact temperatures used in each specific case, however, are initially subject to the boiling points of the reacting materials but gradually increase as the water of esterification is eliminated. In all cases the reaction mixtures are best refluxed until substantially all water evolution has ceased. Following this the excess or unreacted terpene is removed under reduced pressure and the resulting esters are recovered for subsequent use.

EXAMPLE 1

| | Parts by weight |
|---|---|
| Dimethyl fumarate | 72 |
| Laevo alpha phellandrene | 100 |

This mixture is heated and refluxed for about ten hours. The unreacted phellandrene is removed from the ester by distilling the former under reduced pressure e. g. 1–3 mm. (of mercury). A somewhat viscous, balsam-like to solid resin is left as a residue from this distillation. This resin has a saponification equivalent of about 125.

EXAMPLE 2

| | Parts by weight |
|---|---|
| Dimethyl fumarate | 72 |
| Dipentene | 100 |

This composition is heated and refluxed with agitation for about four to six hours and then the unreacted dipentene is removed by distillation under vacuum at 2–3 mm. pressure. A light-colored balsam-like resin of relatively low acid number remains.

EXAMPLE 3

| | Parts by weight |
|---|---|
| Fumaric acid | 348 |
| Triethyl glycol | 480 |
| Dipentene | 200 |

The fumaric acid and triethylene glycol are heated together, preferably under an inert atmosphere such as carbon dioxide, for about two to three hours at about 200° C. A light-yellow ester resin having an acid number about 70–75 is obtained. About 250 parts of this ester resin are reacted with the dipentene under azeotropic conditions and about 2.7 parts by weight of stannic chloride dioxanate are added as a catalyst. The unreacted terpene and any other volatile matter is removed by distillation at 1–2 mm. pressure at about 200° C. About 0.95 mol of terpene combines with the ester per mol of the fumaric acid equivalent. The final product is an amber-colored, balsam-like complex ester which is suitable for use in coating compositions, adhesives, etc.

EXAMPLE 4

*Preparation of dibutyl fumarate*

| | Parts by weight |
|---|---|
| Fumaric acid | 232 |
| Butanol | 416 |
| Stannic chloride dioxanate | 5.4 |
| Toluene | 100 |

These substances are reacted azeotropically, the toluene being an inert diluent to assist in effecting the azeotropic distillation and separation of the water of reaction. The mixture is refluxed for about twelve hours and the toluene is then removed by distillation leaving the dibutyl fumarate ester as a water-white liquid residue which distills at about 110°–111° C. at about 1–2 mm. of pressure. This ester has a saponification number of about 488.

EXAMPLE 5

|   | Parts by weight |
|---|---|
| Dibutyl fumarate | 114 |
| Dipentene | 103 |
| Stannic chloride dioxanate | 1.35 |

This composition is refluxed under the general conditions as previously described for about fourteen hours and the excess dipentene is removed from the resulting product by distilling under vacuum at about 1–2 mm. pressure and at about 160°–180° C. A light-colored, viscous complex ester is obtained having a relatively low acid number.

Other esters of fumaric acid may be substituted for those employed in the examples set forth above such as esters of the following alcohols: ethanol, propanol, isopropanol, amyl alcohol, allyl alcohol, cyclohexanol, benzyl alcohol, ethylene glycol, diethylene glycol, the polyethylene glycols or mixtures thereof (e. g. tetraethylene glycol, pentaethylene glycol, hexaethylene glycol, heptaethylene glycol, octaethylene glycol and dodecaethylene glycol), polymethylene glycols (e. g. decamethylene glycol), octadecandiol, 2,2 dimethyl propanediol-1,3; 1,3 butanediol; 1,2 propanediol; 2-ethyl, 2-butyl butanediol-1,3; glycerol, monoaryl or alkyl ethers of glycerol, polyglycols and polyglycerols.

Furthermore, various mixtures of esters may be used or mixed esters, i. e. esters having two or more ester groups and connected to different alkyl groups. It is especially desirable in some instances to use mixed esters or mixtures of esters, the esters being derived from alcohols having different numbers of hydroxyl groups e. g. a monohydric alcohol and a dihydric alcohol, or a mono or dihydric alcohol with a higher polyhydric alcohol such as glycerol, etc. The properties of the products resulting from the reaction of a terpene hydrocarbon with fumaric esters will vary according to the type of alcohol from which the fumaric ester is derived. Thus liquid products are generally obtained from the monohydric alcohol derivatives while balsam-like or solid resins are obtained from the polyhydric alcohol derivatives.

If esters of the higher polyhydric alcohols which are resinous materials be used, particularly good results are obtained by using an acid ester and adding an alcohol, preferably the alcohol corresponding to that from which the ester is derived, to the reaction mixture. It is also desirable to control the temperature to avoid overheating and to use a suitable catalyst. The temperature should be raised slowly to about 140°–180° C. and after the reaction has proceeded until the mixture is clear, the reaction temperature may be raised to about 180°–210° C. With the higher reaction temperatures, however, premature gelation is most likely to occur.

Characteristic of the products of this invention is the substantial absence of esters of acids having a polybasicity greater than 2, wherefore the viscosities and softening points tend to be lower than the esters prepared from the maleic-terpene adducts of the prior art. By suitable regulation of the reaction conditions we may vary the combining ratio of terpene to fumaric acid within considerable limits. By varying the alkyl groups attached to the fumaric ester we may produce a large number of new derivatives having a wide range of properties thereby furnishing products suitable for diverse industrial uses.

In general our terpene resins are more soluble in hydrocarbons than the phthalic type of alkyd resins. By slight modification of our resins it is possible to obtain resins having a high degree of oil solubility, quick air drying properties, etc. One way is to incorporate small quantities of fatty oil acids and enough glycerol or other desired alcohol to combine therewith in the composition. After the initial reaction of the terpene and fumaric ester has taken place i. e. when the reaction mixture becomes clear, about 20% or more of fatty oil acids (calculated as triglyceride), e. g. linseed oil acids, and a combining equivalent of an alcohol are added to the mixture. It is especially important that the terpene and ester of fumaric acid be combined before the addition of any conjugated, unsaturated fatty oil acids in order to avoid reaction between the ester of fumaric acid and the conjugated fatty oil acids before the terpene has had sufficient time to combine with the ester. It has been found advantageous in some cases to preheat the fatty oil acids before adding them to the reaction mixture.

If more than about 20% of fatty oil be desired in the final product, it may be added during the latter stages of reaction in the form of either fatty oil acids or as the oil itself, as desired. Since the oil is less expensive than the acids, it is usually preferable to add the oil itself rather than the acid. The addition of about 20% of fatty oil acids calculated as triglyceride in the earliest stages of the reaction, as described, causes the composition to become miscible with additional oil upon further reaction. Accordingly large amounts of the corresponding fatty oil or other fatty oils may be added to the composition if the temperature be kept relatively high e. g. about 170° C.

The following example illustrates one method of modifying our polyester resins as described above.

EXAMPLE 6

About 250 parts of triethylene glycol-fumaric acid ester resin (as prepared in Example 3) are reacted with about 200 parts by weight of dipentene in the same general manner as in Example 3 in the presence of about 2.7 parts by weight of stannic chloride dioxanate and about 13 parts by weight of glycerol. The reaction is continued until the reaction mixture becomes clear.

After this initial reaction the second stage of the reaction is begun at which time fatty oil acids may be added. Accordingly about 109 parts by weight of linseed oil fatty acids (alone or mixed with a solvent) which have been preheated to about 170° C. are added slowly to the reaction mixture. This quantity of fatty acids is equivalent to about 20% of linseed oil based upon the amount of resin formed exclusive of the excess terpene. The reaction is continued at about 170°–210° C. for three to four hours, giving a balsam-like polyester resin having a relatively low acid number.

If it be desirable to incorporate more than about 20% of fatty oil acids, the additional amount may be added at this stage of the reaction. Accordingly about 120 parts by weight of linseed oil may be added to the polyester resin obtained above, the temperature of both the fatty oil and the polyester resin being maintained at about 170°–180° C. to give a homogeneous, balsam-like product particularly suitable for use in coating compositions.

Our resins may be modified with any of the fatty oils, examples of which are tung, soya bean, perilla, grapeseed, cottonseed, olein, stearin, etc. It may be desirable to modify the resin with drying oil, particularly if the resin is to be used in air drying coating compositions. For this purpose we have found that linseed oil and linseed oil fatty acids are especially suitable. The term "drying oil" is intended to include semi-drying oils as well as the strictly drying oils.

Obviously various mixtures of fatty oils or fatty oil acids may be used. The resins produced by modification with fatty oils are usually quite soluble in hydrocarbon solvents. They are, therefore, particularly suitable for use in enamels, varnishes, lacquers, etc.

Another way in which the compositions of our invention may be modified in order to obtain oil-soluble products is by the addition of such substances as rosin acids, benzoic acid, etc. to the reaction mixture. If a conjugated compound such as rosin or tung oil acids (particularly beta eleostearic) is used, this addition is preferably made after all or nearly all of the terpene has combined with the ester of fumaric acid as otherwise the modifying substance may combine with the fumaric ester before the latter has had time to combine with the terpene.

In operating our process we have found it advisable although not essential to employ sufficient excess of the terpene over the combining equivalent for the ester of fumaric acid so that this excess of terpene during its volatilization may act mechanically and perhaps azeotropically to assist in the removal of any water which may be formed. When operating in this manner, the reaction vessel is best equipped with a suitable reflux condenser and water trap arranged so that the condensate may be separated continuously, the water retained or separated and the excess terpene returned to the system until the desired degree of addition reaction and of esterification have been attained.

In the operation of our process it is sometimes possible and advantageous to employ inert diluents in the reaction mixture. Among materials suitable for this purpose may be mentioned benzene, toluene, xylene, ethylene dichloride or the like in place of an excess of terpene. These diluents may be removed from the product by distillation or if desirable the compatible diluents may be left with the resin as solvents.

We have also found it possible to substitute a part of our terpenes with a corresponding amount of reactive non-terpene hydrocarbons and as well as other polymerizable, unsaturated bodies as, for example, styrene, methyl styrene, dicyclopentadiene, cumarone, indene and certain vinyl, acrylic and methacrylic esters.

In order to obtain a high ratio of terpene combined with the fumaric ester it is desirable although not always necessary to employ an excess of terpene and/or a catalyst. Suitable catalysts are included in the group of the halogens, hydrogen halides, metallic halides and aromatic sulfonic acids. Of the various catalysts which have been found to catalyze these reactions stannic chloride, stannic chloride dioxanate and the sulfonic acids, e. g. p-toluene sulfonic acid are particularly suitable.

Terpenes suitable for the purpose of this invention are limited to those of the $C_{10}H_{16}$ series. While our "ester process" is eminently suitable for reacting non-conjugated terpenes since these are normally non-reactive with fumaric acid, it is also useful in the reaction of conjugated terpenes. Terpenes which we have found are particularly suitable for use alone or in admixture are alpha and beta pinene, the limonenes, dipentene, terpinolene, alpha and beta phellandrenes, alpha terpinene, $\Delta^{3,8(9)}$p-menthadiene and myrcene. It is also possible to use gum turpentine or steam distilled wood turpentine in place of alpha pinene or of other non-conjugated terpenes with entirely satisfactory results. The use of turpentines or distillates rich in pinene is especially advantageous for economical reasons. Similarly the use of commercial distillates containing mixtures of terpenes which are rich in any of the afore-mentioned conjugated terpenes may be used in place of the individual terpene. Furthermore mixtures of conjugated and non-conjugated terpenes of the $C_{10}H_{16}$ series may also be used. Among these there are a few commercial distillates which contain essentially alpha terpinene, dipentene, or terpinolene and which have a boiling point of between about 170° and 185° C.

Products of this invention have been found to possess great utility. The liquid esters derived from the fumarates of monohydric alcohols may be used as plasticizers for nitrocellulose and in certain cases for ethyl cellulose or other cellulose esters or ethers. These esters may be hydrogenated to provide more light-stable products suitable for the same purposes. Our resinous polyesters are also useful as resins or as resinous plasticizers for cellulose derivatives, particularly nitrocellulose. Many of the polyesters, such as are derived from the esters of polyhydric alcohols with or without fatty acid or drying oil modification, have been found to be oxygen-convertible and of considerable utility in air drying or in stoving paints, varnishes and enamels.

Some of the products may be mixed with suitable fillers to produce linoleum and related plastics. Products of the present invention are also useful for printing or lithographing inks, gaskets, cements or adhesives and for general coating or impregnating purposes.

Such other suitable changes and variations may be made in carrying out our process without departing from the spirit and scope of our invention as defined in the appended claims.

We claim:

1. The reaction product of dibutyl fumarate and dipentene.

2. The reaction product of dipentene with an ester of fumaric acid and a glycol.

3. A reaction product of a non-conjugated terpene-hydrocarbon of the $C_{10}H_{16}$ series and an ester of fumaric acid and an alcohol.

4. A reaction product of a nonconjugated terpene-hydrocarbon of the $C_{10}H_{16}$ series and a glycol ester of fumaric acid.

5. A process for the production of ester condensation products which comprises heating to reaction temperatures a mixture containing a non-conjugated terpene hydrocarbon of the $C_{10}H_{16}$ series and an ester of fumaric acid and an alcohol.

6. A process for the production of ester condensation products which comprises heating to reaction temperatures a mixture containing a non-conjugated terpene hydrocarbon of the $C_{10}H_{16}$ series and an ester of fumaric acid and an alcohol, the temperature, time and other conditions being such as to bring about free and relatively continuous volatilization and removal of water of condensation in admixture with unreacted terpene.

7. A process for the production of ester condensation products which comprises heating to reaction temperatures a mixture containing a non-conjugated terpene hydrocarbon of the $C_{10}H_{16}$ series and an ester of fumaric acid and an alcohol, the temperature, time and other conditions of reaction being such as to bring about free and relatively continuous volatilization and removal of water of condensation in admixture with unreacted terpene, separating water from the admixture and returning the terpene to the reaction.

8. A process for the production of ester condensation products which comprises heating a terpene distillate, which contains essentially a non-conjugated terpene hydrocarbon of the $C_{10}H_{16}$ series, with an ester of fumaric acid and an alcohol, said heating being conducted at a temperature and for a time sufficient to bring about chemical combination of the mixture.

9. A process for the production of ester condensation products which comprises heating to reaction temperatures a mixture containing a non-conjugated terpene hydrocarbon of the $C_{10}H_{16}$ series and an ester of fumaric acid and an alcohol in the presence of an aromatic sulfonic acid catalyst.

10. A process for the production of ester condensation products which comprises heating to reaction temperatures a mixture containing a non-conjugated terpene hydrocarbon of the $C_{10}H_{16}$ series and an ester of fumaric acid and an alcohol, continuing said heating until the reaction mixture becomes clear, adding fatty oil acid and continuing said heating until a homogeneous product is obtained.

THEODORE F. BRADLEY.
WILLIAM B. JOHNSTON.